United States Patent [19]
Ross

[11] 3,762,105
[45] Oct. 2, 1973

[54] APPARATUS FOR FINISHING SURFACES
[75] Inventor: Edmund L. Ross, Dallas, Pa.
[73] Assignee: Owens-Illinois, Inc., Toledo, Ohio
[22] Filed: May 24, 1971
[21] Appl. No.: 146,293

[52] U.S. Cl. .............................................. 51/127
[51] Int. Cl. ............................................. B24b 7/24
[58] Field of Search ...................... 51/110, 126, 127, 51/131, 100 R, 134, 237

[56] References Cited
UNITED STATES PATENTS

| | | | |
|---|---|---|---|
| 3,492,762 | 2/1970 | Heinrich | 51/127 |
| 2,948,086 | 8/1960 | Eger et al. | 51/100 R |
| 1,955,081 | 4/1934 | McClymont | 51/126 |
| 2,970,410 | 2/1961 | Gittins | 51/110 |
| 2,493,206 | 1/1950 | Okey | 51/134 |
| 2,800,748 | 7/1957 | Schulz | 51/100 R |
| 881,646 | 3/1908 | Allen | 51/131 |
| 1,091,407 | 3/1914 | Walkers | 51/131 |
| 1,738,555 | 12/1929 | Bausch | 51/131 |
| 2,741,076 | 4/1956 | Jordan | 51/237 T |

Primary Examiner—Harold D. Whitehead
Attorney—Richard B. Dence and E. J. Holler

[57] ABSTRACT

The invention is illustrated in a preferred embodiment for removing surface defects from glass surfaces having compound curves. The embodiment illustrated utilizes a plurality of rotatable abrading heads at a single abrading or finishing station. A rotatable chuck table supports a succession of glass articles, one at a time, at the abrading station a uniform distance from the plurality of heads. Pivot arms support each abrading head for movement toward and away from the chuck table. Each head is selectively moved into and out of contact with the surface of an article on the chuck table. At least one of the pivot arms is preferably positioned to enable contact by the abrading head supported thereby at a surface area of the article which is displaced from the surface area of the article contacted by the remainder of the plurality of heads. Variations in surface grinding can be obtained by controlling the time an individual head is in glass contact, gradation of abrasive surfaces on the grinding heads, contact pressure of each head, and speed of rotation of each head.

19 Claims, 6 Drawing Figures

INVENTOR.
EDMUND L. ROSS

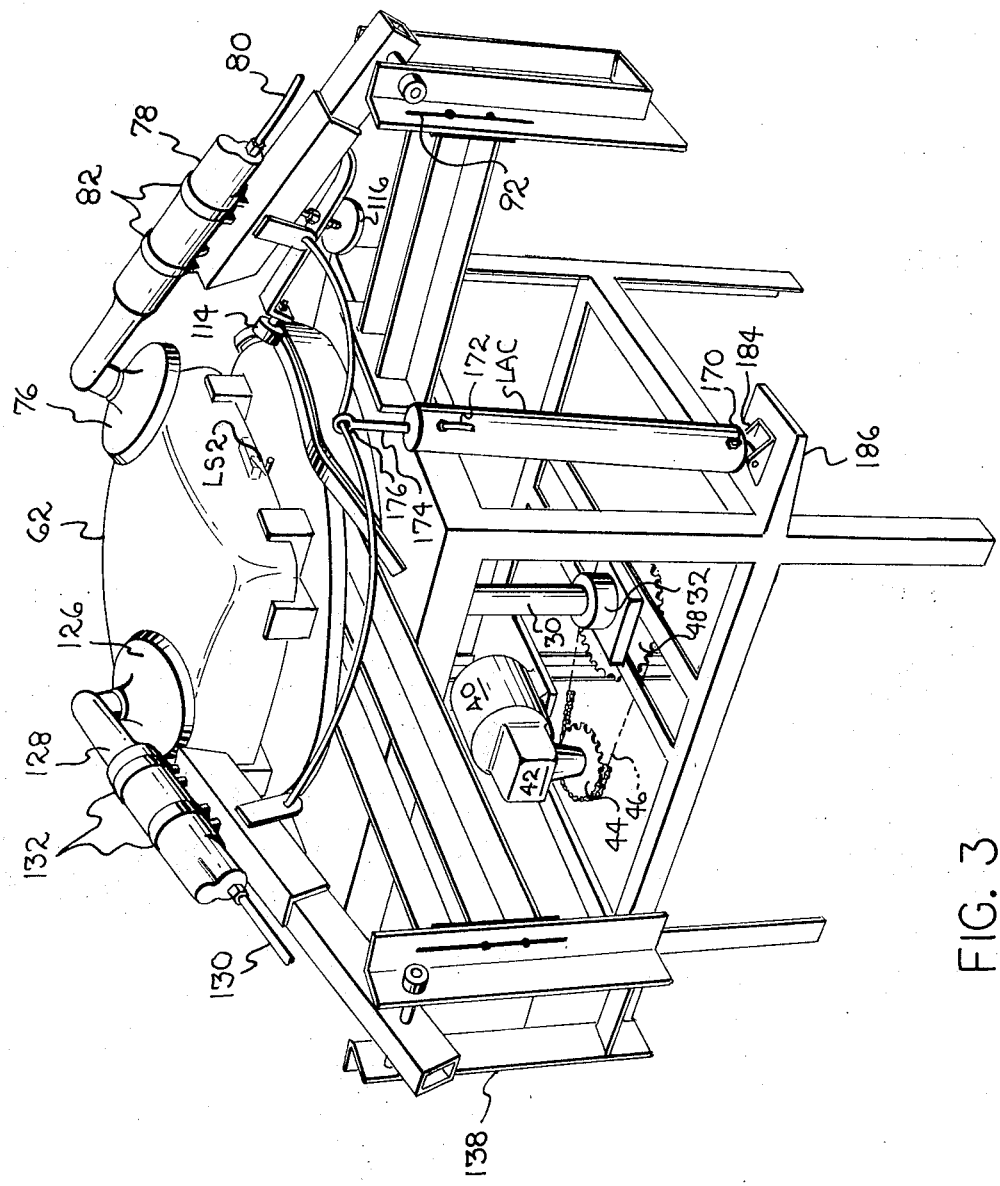

3,762,105

APPARATUS FOR FINISHING SURFACES

BACKGROUND OF THE INVENTION

This invention relates to apparatus for finishing surfaces and more particularly to an apparatus for grinding or polishing relatively large convex glass surfaces and glass surfaces having compound curves, although the invention is in no way limited to such use.

In the manufacture of cathode ray tubes, such as television picture tubes, the panel or viewing screen portions of such tubes are usually formed from charges of molten glass deposited in molds and pressed therein. The external face of the panel is usually of convex form having changing surface curvatures commonly referred to as compound curves. Such changing surface curvatures or compound curves are made up of varying radii, smoothly blended to effect a uniformingly changing curvature, and are of decreasing dimension toward the periphery of the panel. Quite frequently the panels so formed are found to have exterior surface imperfections of a magnitude requiring grinding to produce the degree of quality required for ultimate use.

Since a substantial number of the panels may require further operations, all of the panels manufactured may be routinely sent through a finishing process which may include a number of different steps to achieve the quality desired.

One of the steps in many of the processes was to dry grind glass surfaces to remove such defects as pits, oil spots, loading laps, chill wrinkles, imbedded foreign material, and the like in preparation for overall surface wet grinding and final polishing. Although a number of mechanical approaches have been suggested for the dry grinding step, most manufacturers use methods which are performed entirely by hand requiring selection and handling of the panel, or by completely grinding all of the surface area for the amount of time necessary to completely eliminate the single isolated defect to its individual and total depth.

Accordingly, it is an object of this invention to provide improved apparatus for finishing surfaces.

Another object of this invention is to provide improved apparatus for pre-grinding or dry grinding glass surfaces in preparation for overall wet surface grinding and final polishing.

Still another object of this invention is to provide apparatus for selectively finishing or grinding surface areas without treating the whole surface exposed.

Yet another object of this invention is to provide apparatus which may be utilized for further steps in the process of finishing convex glass surfaces besides the initial pre-grinding step.

SUMMARY OF THE INVENTION

In carrying out the above objects the invention illustrates in the embodiment disclosed herein apparatus for removing imperfections from glassware surfaces which includes abrading means and means for rotating glassware with the surface to be abraded exposed to said abrading means. The abrading means and the ware rotating means are supported for relative movement toward and away from each other. Contact between the abrading means and the surface to be abraded is selectively controlled.

The selective contact means may include cooperating cam means and cam follower means connected to the abrading means and the ware rotating means to effect selection of ware surface areas to be contacted. The selected contact means may also include fluid cylinder means for moving the abrading means into and out of a position enabling contact with the ware surface areas.

Also disclosed are means for detecting the completion of a predetermined abrading cycle and means responsive to the cycle detecting means for interrupting the abrading of the ware. The presence of the ware on the ware rotating means may be sensed and operation of the apparatus may be prevented if ware is not present.

The completion of an abrading cycle is detected for a first piece of ware and the operation of the apparatus is interrupted. The removal of a first finished piece of ware and the placement of a second piece of ware to be abraded on the ware rotating means may be sensed. Means are provided responsive to the removal and placement sensing means for initiating an abrading cycle for the second piece of ware.

The means for supporting the abrading means and the ware rotating means for relative movement with respect to each other includes pivot arm means for carrying the abrading means, and means for moving the pivot arm toward and away from the ware rotating means. Means for removably securing counterweight means to the pivot arm means is advantageously provided to control contact pressure between the abrading means and the ware surface.

The pivot length of the abrading means-pivot arm assembly may be adjusted. The distance of the pivot arm means from the ware rotating means may be adjusted. Air motor means is disclosed for rotating an abrading head of the abrading means. Operation of the air motor means may be enabled in response to an initiation of the abrading cycle for a glassware surface. Means are provided for interrupting operation of the air motor and thus rotation of an abrading head in response to completion of an abrading cycle of a glassware surface.

The preferred embodiment has a plurality of the abrading heads, and means for selectively moving each of the abrading heads toward and away from abrading contact with an exposed surface of the article on the article rotating means. At least one of the support means for one of the abrading heads is positioned to enable contact by that head with a surface area which is displaced from the surface area contacted by the other abrading head or heads.

The amount of surface material removed by one of the abrading heads may be regulated with respect to the remainder of the heads. Material removal regulation may be accomplished by providing one abrading head with an abrasive surface which has a gradation different from the abrasive surface of the remaining heads. The speed of rotation of one head may be controlled with respect to the speed of rotation of the remaining heads. The contact pressure of one head may be regulated with respect to the contact pressure of the remaining heads. The amount of time that one head is in contact with an exposed surface of the article may be regulated with respect to the amount of time the remainder of the abrading heads are in contact with the exposed surface.

Other objects, advantages, and features of this invention will become apparent when the following description is taken in conjunction with the accompanying drawings, in which:

FIG. 3 is a view in perspective taken from the left of FIG. 1 illustrating the apparatus in operation;

DESCRIPTION OF THE PREFERRED EMBODIMENTS

Figure 1:
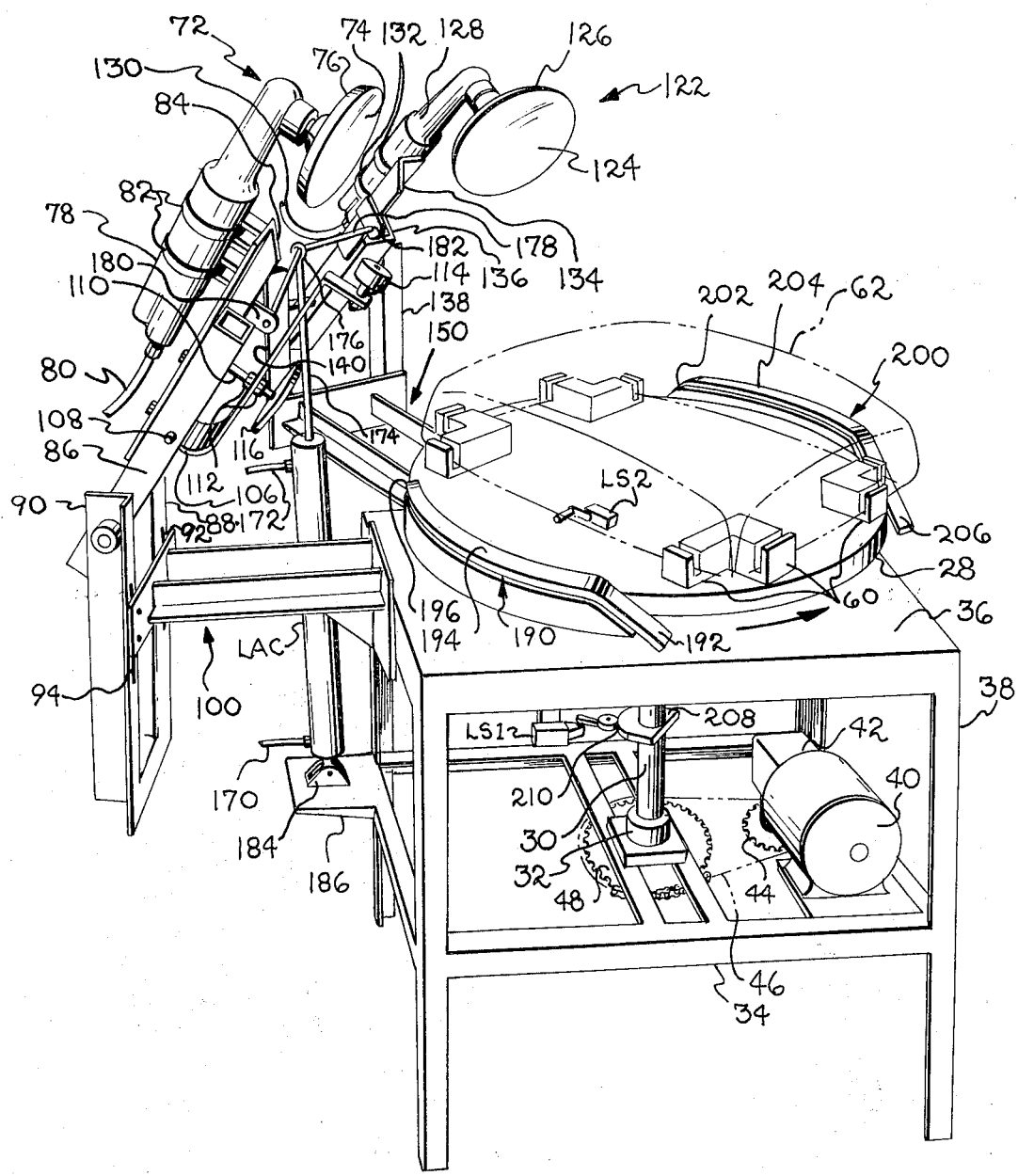
FIG. 1 is a perspective elevational view of apparatus embodying the teachings of this invention which has completed or is about to initiate an abrading cycle.
Figure 2:
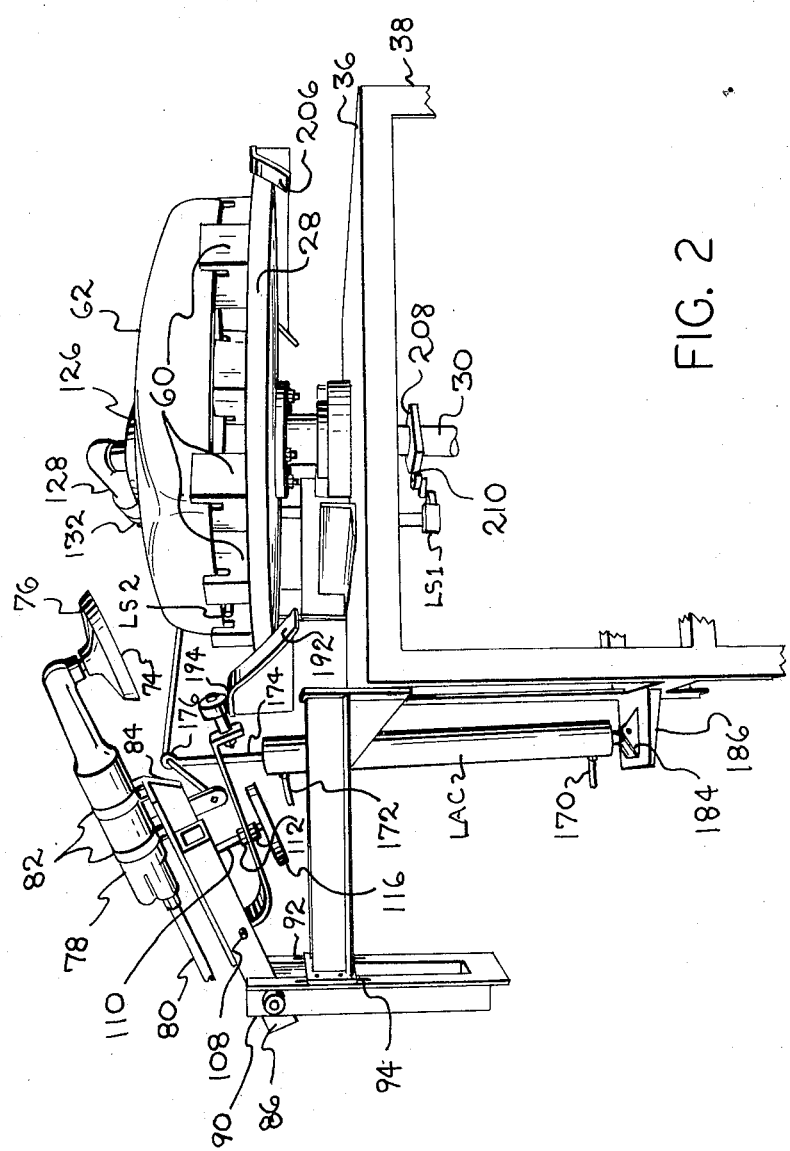
FIG. 2 is a view in perspective of the apparatus of FIG. 1 taken from the left side of FIG. 1 illustrating the apparatus in operation.

Referring to FIGS. 1, 2 and 3 there is illustrated apparatus for carrying out the teachings of this invention. A chuck table 28 is rotatably supported on a drive shaft 30 which is journally supported in bearings 32 carried by a lower frame portion 34 and an upper frame portion 36 of a bench-like frame 38.

A motor 40 rotates table 28 via a speed reducer 42 having an output sprocket 44 which is connected by a chain or belt 46 to a drive sprocket 48 secured to the bottom of the drive shaft 30.

Movable nest blocks 60 adjustably mounted on table 28 provide a universal chuck arrangement positioned to receive ware to be ground, in this instance a television tube face panel. The universal chuck supports a number of different sizes, with the area of each of the sizes of ware to be worked on supported at a uniform height. The ware is represented in this instance by a television face panel 62, shown in dotted lines to enable the chuck table 28 and chucks 60 to be seen more clearly.

A first grinding head assembly is indicated generally at 72. The assembly 72 includes an abrasive pad 74 carried on a resilient pad carrier 76, the carrier being advantageously cupped to conform to the curves of the ware area being ground. The carrier 76 is rotated by an air motor 78 receiving air pressure through a conduit 80.

The assembly 72 is secured by adjustable clamps 82 to a bracket 84 carried on a pivot arm 86. The arm 86 is pivotally supported between upwardly extending and spaced standards 88, 90. Slots 92 and 94 are formed in the standards 88 and 90, respectively, permitting vertical adjustment of the grinding head assembly 72. The adjustable clamps 82 permit lengthwise adjustment of the grinding head assembly 72 and thus the adjustment of the effective length of the pivot arm-grinding head assembly. A bracket assembly 100 secured to the frame 38 and the standards 88, 90 supports the abrading head assembly 72 in a fixed position with respect to the chuck table 28.

Pivot arm 86 has secured thereto a cam arm 106 which is pivotally connected at one end to a shaft carried on the arm 106. A threaded cam arm support member or bolt 110 is attached at one end of pivot arm 86 and extends through cam arm 106. Nuts 112 are screwed onto bolt 110, one on each side of arm 106, and comprise means for adjusting position of the cam arm 106 relative to the pivot arm 86. A cam follower wheel 114 is rotatably carried on the end of arm 106.

A counterweight 116 may be removably secured on the bolt 110, to urge the pivot arm 86 toward the ware surface with a force depending upon the weight and position of the counterweight 116.

A second grinding head assembly is indicated generally at 122 and comprises an abrasive pad 124 carried by a resilient pad carrier 126, the carrier again being advantageously cupped to conform to curves of the ware area being ground.

An air motor 128 rotates the carrier 126 in response to the receipt of air pressure through the conduit 130. The air motor 130 is secured by adjustable clamps 132 to a bracket 134 carried on a pivot arm 136. The arm 136 is pivotally supported between the upwardly extending and spaced standards 138, 140. Although not shown in the standards 138, 140 for the sake of clarity, it is to be understood that slots may be formed in the standards 138, 140 to provide vertical adjustment of the head assembly 72. A bracket assembly 150 is secured to the frame 38 and to the standards 138, 140 to position the abrading heads at a desired distance from the chuck table.

In the embodiment illustrated it was desired that the abrasive pad 124 contact the surface of the panel 62 at a different area than that of the abrasive pad 74, and further that the abrasive pad 124 maintain contact with the panel 62 at all times during the abrading cycle. However, it should be understood that if selective grinding of different areas is desired or required then a cam follower assembly similar to that illustrated for pivot arm 86 may be utilized on pivot arm 136.

Also for purposes of clarity in presenting the invention in the drawings, a counterweight has not been shown nor means for attaching a counterweight to the pivot arm 136. However, if the counterweight is desired to vary the grinding pressure of the head assembly 122, then a counterweight may be attached to the pivot arm 136 in the same manner as that shown for the pivot arm 86.

An air cylinder LAC has air supply and exhaust conduits 170, 172 extending from the body of the cylinder. A reciprocable piston rod 174 has an eye structure 176 formed on the outer end thereof. A flexible cable, chain or the like 178 is threaded through or connected to the eye structure 176. One end of the cable 178 is secured to bracket 180 on the pivot arm 86 while the other end is secured to bracket 182 on the pivot arm 136.

The cylinder body of the fluid cylinder LAC is pivotally supported at the bottom by a pivot bracket assembly 184 connected to a frame portion 186 extending from the lower frame portion 34.

A cam track assembly 190 is secured by bolts or the like to one side of the chuck table 38 and rotates therewith. The cam track assembly 190 has an inclined track portion 192, a relatively flat or dwell track portion 194, and a declined track portion 196.

Similarly, a cam track assembly 200 is secured to the side of table 38 opposite to that of assembly 190, and also rotates therewith. The cam track assembly 200 includes an inclined track portion 202, a flat or dwell track portion 204, and a declined track portion 206. The cam track assemblies 190, and 200 are positioned with respect to the cam follower wheel 114 on pivot arm 86 so that the cam follower wheel 114 registers with and cooperates with the cam assemblies 190, 200 when the abrading assembly 72 is lowered to a contact enabling position.

In order to be able to detect the end, or beginning, of an abrading cycle a cam 208 has been provided on a shaft 30. The cam 208 has an outwardly extending portion 210 which engages the cam follower wheel of the limit switch LS1 and actuates LS1 contacts in the control circuit when a grinding cycle or operation is completed. The cam 208 may enable detection of more than one revolution or less than one revolution by mounting the cam on a second shaft and turning the second shaft through a gear connection to the drive shaft.

A limit switch LS2 is mounted on the chuck table 28 to detect the absence or presence of the face panel 62 in the chuck. An output from the limit switch LS2 may be provided through connections to contacts describing an annular path on the underside of the table for sensing by various pickup means.

Figure 4:
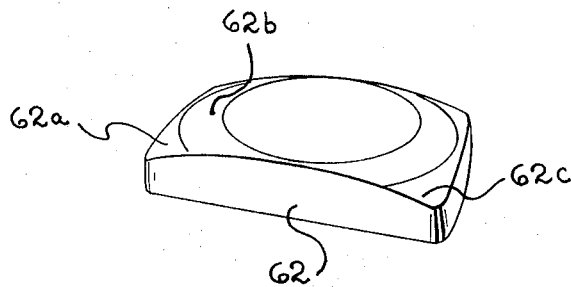
FIG. 4 is a view in perspective of a face panel illustrating the process performed by the apparatus of FIG. 1.

In the operation of the apparatus illustrated in FIGS. 1, 2 and 3 the grinding head assemblies 72, 122 are lowered by retraction of the rod 174 of the fluid cylinder LAC until the assemblies 72, 122 are in contact enabling position. In the embodiment shown, the abrasive pad 124 will then be in full contact and stay in contact with the face panel of the television tube 62 to describe a path illustrated at 62b in FIG. 4 as the panel rotates.

At the same time the grinding head assembly 72 will be lowered to a contact enabling position, but will not necessarily contact the surface of the panel 62. As best seen in FIGS. 2 and 3, during a portion of the rotation of the chuck table 28 the cam follower wheel 114 will be in contact with either the cam assembly 190 or the cam assembly 200. As the table 28 rotates in the direction shown by the arrow in FIG. 1 the cam follower wheel 114 will initially contact the inclined portion 192 of the assembly 100 which will lift the grinding head assembly 72 away from the contact with the face panel 62. As the cam wheel 114 rides along the flat or dwell portion of the cam assembly 190 no contact is permitted between the grinding head assembly 72 and the panel 62. When the wheel 114 traverses the declined portion 196 of assembly 190, the grinding head assembly is lowered into contact with the face panel and will abrade and finish that corner, the one end of the rectangular face panel, and the subsequent corner as illustrated by the path noted at 62a in FIG. 4.

As the chuck table 28 rotates further the inclined portion 202 of the assembly 200 contacts the wheel 114 and urges the grinding head assembly 72 away from the panel 62. No contact is permitted as the wheel traverses the flat or dwell portion 204 of the assembly 200. Contact is reestablished as the wheel traverses downwardly along the declined portion 206 of the assembly 200 to once more reestablish contact with the panel 206 and to abrade or finish the corner then contacted, the extreme other end and the subsequent corner of the panel 62 in a path as illustrated at 62c in FIG. 4.

The panel 62, or other article held on the chuck table 28, may thus be selectively ground at points or spots determined by the cam assembly arrangements which are connected to the chuck table 28. Depending upon the size of the article and the shape of the article, the configurations of the various cam assemblies which are useful with the apparatus shown will be varied to effect the grinding desired. It should also be noted that although only two grinding head assemblies have been shown that three or more may be utilized in either a steady contact with, or a selected contact with, the panel 62 to remove defects in continuous or selected areas.

Figure 6:
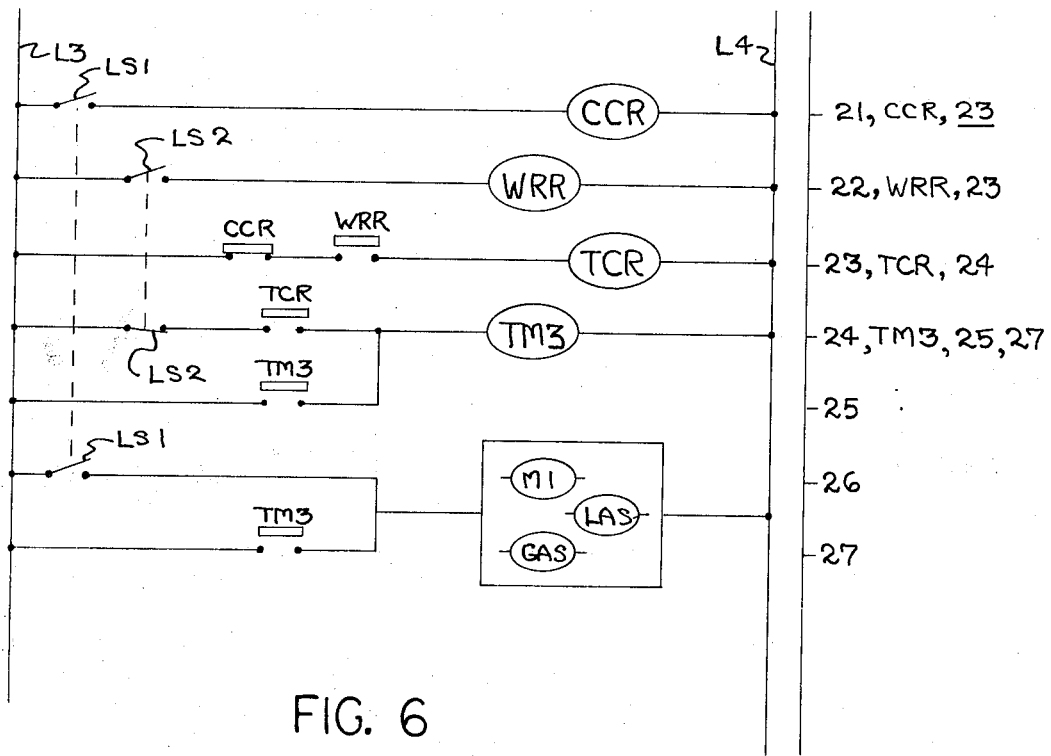
FIG. 6 is a schematic diagram of a circuit for effecting a control alternate to that illustrated in FIG. 5.
Figure 5:
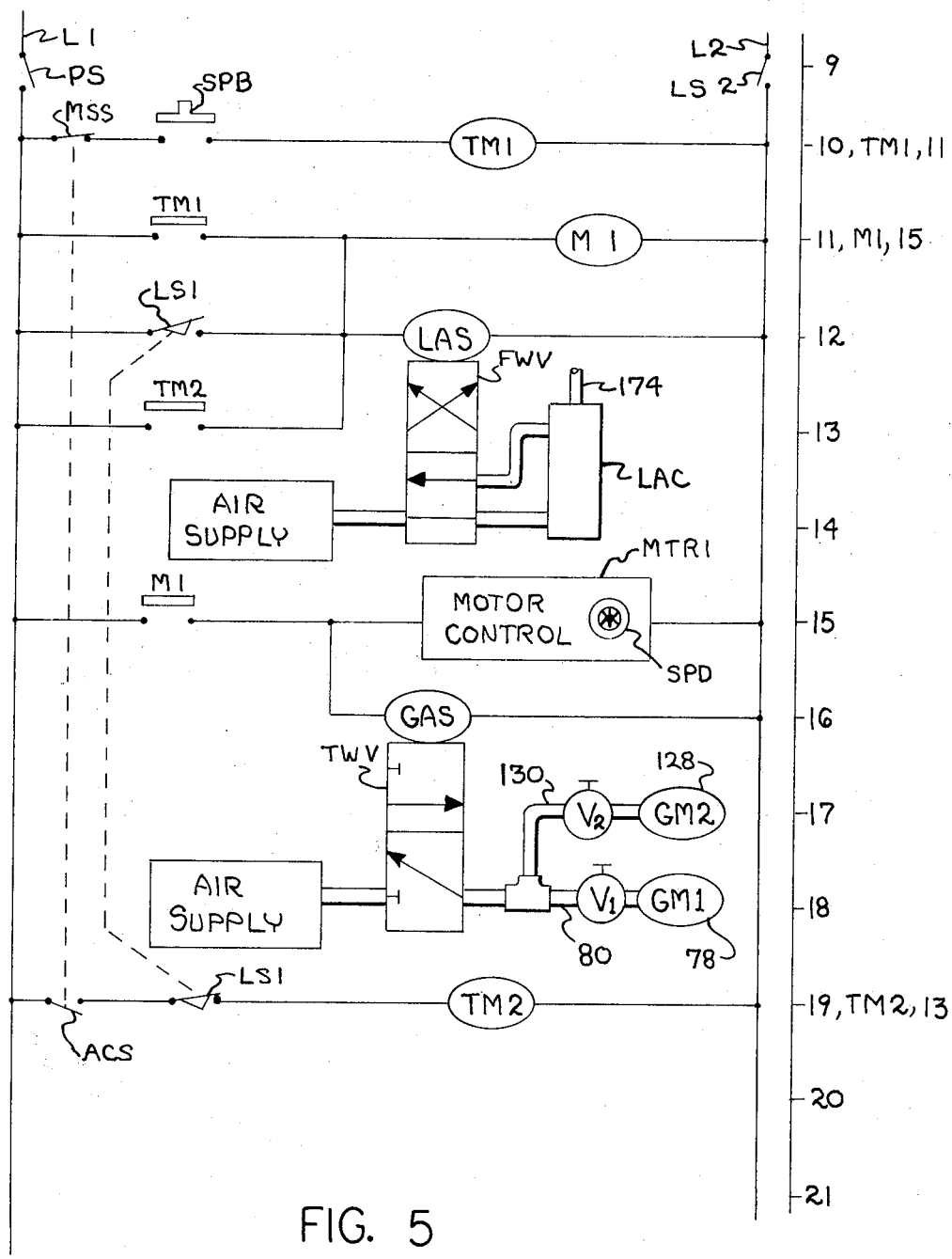
FIG. 5 is a schematic diagram of a circuit for controlling the apparatus of FIG. 1.

Referring to FIGS. 5 and 6 there are shown circuit diagrams which illustrate alternate embodiments of control methods for the apparatus illustrated in FIGS. 1, 2 and 3. It will be noted that the electrical circuit of FIG. 5 and FIG. 6 have been laid out in line diagram form. The components can be readily located by reference to the line number where the component is positioned.

Further, contact switching operations may normally be noted without designating a mechanical tie between the contacts and the actuating means. The contacts may be located at any convenient position, even though quite remote from their actuating means. Cross reference between the actuating means and its associated contacts is easily accomplished by noting in the right hand margin of the drawings the reference character of the actuating means, for example motor relay M1, adjacent line number 11, the line in which the contact actuating relay coil M1 is located for energization. Following the reference character the line number in which the M1 contacts appear are noted, i.e. 15.

A contact line number notation that is not underlined indicates that those contacts are normally open, as with respect to the M1 contacts in line 15. A contact line number notation that is underlined indicates that those contacts are normally closed, e.g. as with respect to the cycle complete relay contacts CCR designated adjacent line 21 in FIG. 6, and appearing in line 23. Other actuating means and their associated contacts are similarly noted.

Referring now to FIG. 5 there is illustrated both manual and automatic modes of operation. The power switch PS in line 9 is closed to supply power through leads L1 and L2 to a control circuit. Limit switch contacts LS2 in line 9 will open the power circuit in power lead L2 if an article is not present in the chuck table 28 to cause actuation of the limit switch LS2 located thereon and close the LS2 contacts in line 9 of FIG. 5.

An operator actuated manual start switch MSS in line 10 is to be closed when manual operation is desired. An operator actuated automatic control switch ACS in line 19 is to be closed when automatic operation is desired. The switches MSS and ACS are ganged together so that when one is closed the other is open to prevent the equipment from attempting to function in both modes at the same time.

Assume that the manual start switch MSS in line 10 is closed and that a face panel 62 is in position on the chuck table 28, thereby closing limit switch contacts LS2 in line 9. Closure of the power switch contacts PS in lead L1 enables the circuit for manual operation. Since the limit switch LS1 is engaged by the cam portion 210 the limit switch contacts LS1 in line 12 of FIG. 5 are open. Since there is no alternate circuit through the open timer unit contacts TM1 in line 11 or the open timer unit contacts TM2 in line 13, the motor relay M1 and the lift air solenoid LAS in lines 11 and 12 cannot be energized.

The start push button SPB in line 10 is depressed to energize timer unit TM1 through the closed manual start switch MSS. Energization of the timer unit TM1 closes TM1 front contacts in line 11 enabling energization of the motor relay M1 and the lift air solenoid LAS in lines 11 and 12. Energization of the lift air solenoid LAS reverses the connections from the air supply in line 14 via the four-way valve FWV in lines 13 and 14 to the lift air cylinder LAC. The reversal of connections causes the lift air cylinder LAC to retract the piston rod 174. Retraction of the piston rod 174 lowers the grinding head assemblies 72, 122 to ware surface contact enabling position as the flexible cable 178 secured to brackets 180, 182 of pivot arms 136, 156 follows the retracting rod 174 downwardly.

Energization of the motor relay M1 in line 11 closes front contacts M1 in line 15 to energize the motor control MTR1 in line 15 and the grinder air solenois GAS in line 16. Energization of solenoid GAS connects the air supply in line 18 via the two-way valve TWV in lines 17, 18 to the air motor 78, 128 to drive the grinding heads 76, 126. It will be noted that adjustable valves V1 and V2 are provided in conduit 80, 130 so that the amount of pressure supplied to the air motor 78, 128 can be regulated to regulate the speed of rotation of the abrasive pads 74, 124 either individually or with respect to each other.

Energization of the motor control MTR1 starts motor 40 and rotation of chuck table 28 as the assembly 72, 122 are lowered into contact enabling position. The speed of rotation of the chuck table 28 may be controlled by manually setting the speed by turning the speed control knob SPD on the motor control MTR1.

After the drive shaft 30 has turned a sufficient amount the cam follower of the limit switch LS1 is no longer actuated by the cam surface 210 and the limit switch contacts LS1 in line 12 close to maintain the starting and running circuit energized for the remainder of the abrading cycle. After the limit switch contacts LS1 close the timer unit TM1 in line 10 times out and contacts TM1 in line 11 open.

At the completion of an abrading process or cycle, cam surface 210 again engages the cam follower of the limit switch LS1 opening LS1 contacts in line 12. The lift air solenoid is deenergized causing cylinder LAC to lift assembly 72, 122 out of contact enabling position. Motor relay M1 is deenergized opening contacts M1 in line 15 to deenergize the motor control MTR1 and the grinder air motor solenoid GAS in line 16. The manual cycle of the abrading process control is now completed and the apparatus turned off. A one cycle operation may again be initiated manually by closing the start push button SPB.

If automatic operation is desired then the manual start switch MSS in line 10 is opened and the automatic control switch ACS is closed in line 19. If the power switch PS and the limit switch contacts LS2 are closed in line 9 power is supplied via the automatic control switch ACS to the timer unit TM2 also in line 19. The timer unit TM2 is set to provide a closure of its contacts TM2 a predetermined period after energization. Another set of limit switch contacts LS1 are provided in line 19. However, the LS1 contacts in line 19 are actuated closed when the cam surface 210 contacts the cam follower of the limit switch LS1. Since the machine is at the end of one cycle and at the beginning of a succeeding cycle the limit switch contacts LS1 are open in line 12 and closed in line 19.

The timer unit TM2 is set to close its contacts TM2 in line 13 a predetermined time after energization power has been supplied to the unit. Thus, after the expiration of the time period, the contacts TM2 close in line 13 to energize the motor relay M1 in line 11 and the lift air solenoid LAS in line 12. Closure of M1 contacts in line 15 energizes the motor control MTR1 and the grinding motor air solenoid GAS in line 16 to initiate the cycle described hereinbefore with respect to manual operation.

When the abrading process is completed and the limit switch contacts LS1 open in line 12 the abrading process is stopped as described hereinbefore. However, limit switch contacts LS1 close in line 19 and a predetermined time later the TM2 contacts will close in line 13 to initiate a new cycle. A sufficient time delay is set into the time unit TM2 to enable an operator to remove ware from the chuck table 28 and position a new piece of ware on table 28 for the abrading or finishing process. Alternatively, the time may be set somewhat shorter to only provide the operator plenty of time to remove the ware from the chuck table 28 since the provision of the LS2 contacts in line 9 senses the presence or absence of ware and interrupts operation of the apparatus and the control circuit if ware is not in place on the table.

When power is again supplied to the control circuit of FIG. 5 by either operator or automatic transfer and replacement of ware on the table 28, the timer unit TM2 times out and closes contacts TM2 in line 13 to initiate a new cycle.

When cam surface 210 moves sufficiently so that there is no longer any actuating contact with the limit switch LS1, the LS1 contacts in line 19 open deenergizing the timer unit TM2 and opening the TM2 contacts in line 13. However, if the limit switch contacts LS1 in line 19 have opened, correspondingly the limit switch contacts LS1 in line 12 have closed so that the cycle continues uninterrupted.

Referring to FIG. 6 there is shown an alternative control circuit for the apparatus illustrated in FIGS. 1, 2 and 3 in which the machine automatically completes a cycle and shuts down unless a piece of ware is removed and replaced by another piece of ware. This control mode is different from the automatic control mode illustrated in FIG. 5 where the machine will continue to process the same piece of ware if left on the chuck table 28 and ignored by the operator. The control mode in FIG. 6 is more suited to obtaining the operator's attention and is more adaptable for use with automatic transfer devices which automatically remove processed ware and places a new piece of ware to be processed in the machine.

When the abrading process or cycle is completed limit switch contacts LS1 open in line 26 of FIG. 6 to deenergize the motor run relay M1, and to deenergize the solenoids LAS and GAS in the manner shown in FIG. 5. Limit switch contacts LS1 in line 21 are ganged with the LS1 contacts in line 26 and also open to deenergize cycle complete relay CCR, closing CCR back contacts in line 23.

At this point nothing further happens in the cycle since the LS1 contacts in line 26 are opened and the timing unit contacts TM3 in line 27 are opened so that there are no energization paths for the M1 relay and the LAS, GAS solenoids.

The LS2 contacts in lines 22 and 24 are also ganged together, with the LS2 contacts in line 22 being open when ware is present on the chuck table and the LS2 contacts in line 24 being closed when ware is present on the chuck table. Thus, at this moment in the operation the LS2 contacts in line 24 are closed but no energization of the timing unit TM3 is possible since the TCR contacts in line 24 are open. On the other hand the LS2 contacts in line 22 are open and therefore there can be no energization of the ware removal relay WRR.

When the finished or abraded article is removed from the chuck table 28 the LS2 contacts in line 24 open to no effect, and the LS2 contacts in line 22 close to energize the ware removal relay WRR. WRR contacts close in line 23 completing the energization circuit for the cycle complete and ware removed relay TCR in line 23. The TCR relay line is energized and TCR front contacts in line 24 close to enable the energization circuit for the timing unit TM3 in line 24. Nothing happens at this point however since the LS2 contacts in line 24 are open because there is no ware present on the chuck table 28.

When a new article to be finished is placed in the universal chuck, the limit switch contacts LS2 in line 22 open to deenergize the ware removal relay WRR and open contacts WRR in line 23 to deenergize the TCR relay. Advantageously, the TCR relay is provided with a preset delayed dropout action, so that TCR front contacts in line 24 do not open for the moment. This enables the closure of limit switch contacts LS2 in line 24, in response to the placing of ware on the chuck table, to energize the timer unit TM3 and pull in front contacts TM3 in line 25 to establish a holding circuit for timer unit TM3.

The cycle complete and ware removal sensing relay TCR now drops out contacts TCR in line 24 after its preset delay expires, but to no effect since the holding circuit for timer unit TM3 has been established through TM3 contacts in line 25.

When timer unit TM3 was energized by the sensing of the placement of a new article in the chuck, TM3 contacts also close in line 27 to complete an energization circuit around and in parallel with the open LS1 contacts in line 26. The closure of TM3 contacts in line 27 energizes the motor relay M1, the lift air solenoid LAS and the grinder air solenoid GAS in the manner shown in FIG. 5, to start a new abrading process or cycle.

After the motor 40 has rotated the shaft 30 a sufficient distance to move cam surface 210 out of its actuation position for limit switch LS1, the limit switch LS1 contacts close in line 26 to maintain energization of relay M1 and solenoid LAS and GAS. The LS1 contacts in line 21 also close to energize the cycle complete relay CCR and open CCR back contacts in line 23.

The timing motor and timing unit TM3 then times out, opening TM3 front contacts in lines 24 and 27. The holding circuit in line 24 is broken and the control circuit is now completely reset and ready for operation at the end of the cycle that has been initiated.

There has thus been described apparatus which is particularly useful when multiple grinding heads are employed that may be programmed by cams. The glass surface is supported on a rotating table using a universal chuck to maintain various sizes of face panels at a uniform height. The apparatus allows spot grinding of glass that can be changed by timing of table rotation, cam dwell variation, grinding head speed, single or multiple numbers of grinding heads, variable grinding head pressure, and gradation of grinding abrasive paper with succeeding heads. One person can operate multiple machine setups through automatic control time cycles. The apparatus is adaptable for use with automatic transfer units for placing and removing panels automatically.

In conclusion, it is pointed out that while the illustrated examples constitute practical embodiments of my invention, I do not limit myself to the exact details shown since modification of these details may be made without departing from the spirit and scope of the invention.

I claim:

1. Apparatus for removing imperfections from glassware surfaces comprising
   a. abrading means,
   b. means for individually rotating a piece of glassware about an axis of the glassware with a surface to be abraded exposed to said abrading means,
   c. means for supporting said abrading means and said ware rotating means for relative movement toward and away from each other, and
   d. means responsive to the individual rotation of said glassware for selectively controlling contact between said abrading means and said glassware to be abraded to effect abrasion of predetermined different ware surface areas during rotation of said glassware.

2. Apparatus as defined in claim 1 in which said selective contact means includes cooperating cam means and cam follower means connected to said abrading means and said ware rotating means to effect selection of ware surface areas to be contacted.

3. Apparatus as defined in claim 1 which further includes
   a. means for sensing the presence of ware on said ware rotating means, and
   b. means responsive to said ware sensing means for preventing apparatus operation if ware is not present.

4. Apparatus as defined in claim 1 which further includes
   a. means for detecting the completion of an abrading cycle for a first piece of ware and interrupting apparatus operation,
   b. means for sensing the removal of a first finished piece of ware and the placement of a second piece of ware to be abraded on said ware rotating means, and
   c. means responsive to said removal and placement sensing means for initiating an abrading cycle for said second piece of ware.

5. Apparatus for removing imperfections from glassware surfaces comprising,
   a. abrading means,
   b. means for individually rotating a piece of glassware about an axis of the glassware with a surface to be abraded exposed to said abrading means,
   c. means for supporting said abrading means and said ware rotating means for relative movement toward and away from each other, and
   d. means for selectively controlling contact between said abrading means and said surface to be abraded,
   e. said means for supporting said abrading means and said ware rotating means for relative movement with respect to each other including pivot arm means for carrying said abrading means, and means for moving said pivot arm means toward and away from said ware rotating means, f. said selective contact means including cooperating cam means and cam follower means connected to said pivot arm means and said ware rotating means to move said abrading means into contact with said ware surface areas to be contacted and out of contact with the rest of the ware surface areas.

6. Apparatus as defined in claim 5 which further includes fluid cylinder means operable to move said pivot arm means into and out of a position enabling cam means and cam follower means cooperation.

7. Apparatus for removing surface defects from glass articles comprising, a. a plurality of abrading heads for operating on a glass article at an abrading station, b. means for rotating a glass article at said abrading station with a surface exposed to said plurality of abrading heads for a finishing process, c. means for supporting each of said abrading heads for movement toward and away from said article rotating means, and d. means responsive to the rotation of said article rotating means for selectively moving each of said abrading heads toward and away from abrading contact with an exposed surface of an article on said article rotating means.

8. Apparatus as defined in claim 7 in which said support means for at least one of said abrading heads is positioned to enable contact by that head with a surface area which is displaced from the surface area contacted by the remainder of the plurality of abrading heads.

9. Apparatus as defined in claim 7 which further includes a. means for rotating each of said abrading heads, and b. means for controlling the speed of rotation of said one head with respect to the speed of rotation of the remaining heads.

10. Apparatus as defined in claim 7 which further includes means for regulating the contact pressure of one abrading head on an exposed surface of an article with respect to the contact pressure of the remaining heads to obtain a different abrading finishing effect.

11. Apparatus as defined in claim 7 which further includes means for regulating the amount of time one abrading head is in contact with an exposed surface of an article with respect to the amount of time the remainder of the abrading heads are in contact with an exposed surface.

12. Apparatus for removing surface defects from glass surfaces having compound curves comprising, a. a plurality of rotatable abrading heads for operation on a glass article at an abrading station, b. rotatable chuck means at said abrading station for individually supporting a glass article thereon which has surfaces with compound curves at a uniform distance from said plurality of heads, c. pivot arm means supporting each abrading head for movement toward and away from said chuck means, and d. means responsive to rotation of said chuck means for selectively moving each abrading head into and out of contact with a surface of an article on said chuck table means.

13. Apparatus as defined in claim 12 in which at least one of said pivot arms is positioned to enable contact by the abrading head supported thereby at a surface area of the article which is displaced from the surface area of the article contacted by the remainder of said plurality of abrading heads.

14. Apparatus as defined in claim 12 in which said selective contact means includes a. cam means carried on and rotatable with said chuck table means, and b. cam follower means connected to at least one of said pivot arms.

15. Apparatus as defined in claim 14 in which said selective contact means further includes means for lifting all of said plurality of heads out of surface contact.

16. Apparatus as defined in claim 14 in which said selective contact means further includes means for lowering all of said plurality of heads to a position enabling surface contact.

17. Apparatus as defined in claim 12 which further includes means responsive to rotation of said chuck table means for providing a signal when an abrading cycle is completed.

18. Apparatus as defined in claim 17 which further includes means responsive to said cycle completion signal for interrupting abrading by said abrading heads.

19. Apparatus as defined in claim 17 which further includes means responsive to the removal of an article from said chuck table means for enabling initiation of a successive abrading cycle.

* * * * *

UNITED STATES PATENT AND TRADEMARK OFFICE
CERTIFICATE OF CORRECTION

PATENT NO. : 3,762,105
DATED : October 2, 1973
INVENTOR(S) : E. L. Ross

It is certified that error appears in the above-identified patent and that said Letters Patent are hereby corrected as shown below:

Col. 9, line 14, after "relay", delete "line".

Signed and Sealed this

Nineteenth Day of April 1977

[SEAL]

Attest:

RUTH C. MASON
Attesting Officer

C. MARSHALL DANN
Commissioner of Patents and Trademarks